United States Patent
Theytaz et al.

(10) Patent No.: US 7,131,751 B1
(45) Date of Patent: Nov. 7, 2006

(54) ATTACHMENT SYSTEM FOR USE IN AN OPTICAL ILLUMINATION SYSTEM

(75) Inventors: Olivier Theytaz, Savigny (CH); Pascal Eichenberger, Lausanne (CH); Christian Blandin, Ballincollig (IE); Niall White, Thurles (IE); Baptiste Merminod, Lausanne (CH); Olivier Egloff, Le Mont-sur-Lausanne (CH)

(73) Assignee: Logitech, Inc., Fremont, CA (US)

( * ) Notice: Subject to any disclaimer, the term of this patent is extended or adjusted under 35 U.S.C. 154(b) by 0 days.

(21) Appl. No.: 10/122,488

(22) Filed: Apr. 12, 2002

(51) Int. Cl.
*F21V 21/00* (2006.01)
*F21V 17/00* (2006.01)

(52) U.S. Cl. ............... 362/396; 362/455; 345/158; 345/166

(58) Field of Classification Search ............ 362/800, 362/396, 455; 345/166, 161, 158
See application file for complete search history.

(56) References Cited

U.S. PATENT DOCUMENTS

| | | | |
|---|---|---|---|
| 3,285,548 A * | 11/1966 | Matto et al. | |
| 3,286,255 A * | 11/1966 | Sanchez | |
| 3,659,093 A * | 4/1972 | Rietch | 240/152 |
| 4,195,330 A * | 3/1980 | Savage, Jr. | 362/226 |
| 4,521,772 A | 6/1985 | Lyon | |
| 4,521,773 A | 6/1985 | Lyon | |
| 4,794,384 A | 12/1988 | Jackson | |
| 4,799,055 A | 1/1989 | Nestler et al. | |
| 4,866,258 A * | 9/1989 | Ueda et al. | 235/462.49 |
| 4,908,743 A * | 3/1990 | Miller | 362/238 |
| 5,264,998 A * | 11/1993 | Bax | 362/226 |
| 5,291,028 A * | 3/1994 | Droge et al. | 250/568 |
| 5,440,468 A * | 8/1995 | Savage, Jr. | 362/226 |
| 5,517,211 A * | 5/1996 | Kwang-Chien | 345/166 |
| 5,578,813 A | 11/1996 | Allen et al. | |
| 5,644,139 A | 7/1997 | Allen et al. | |
| 5,686,720 A | 11/1997 | Tullis | |
| 5,703,353 A | 12/1997 | Blalock et al. | |
| 5,709,462 A * | 1/1998 | Rumpel | 362/249 |
| 5,729,008 A | 3/1998 | Blalock et al. | |
| 5,769,384 A | 6/1998 | Baumgartner et al. | |
| 5,786,804 A | 7/1998 | Gordon | |
| 5,793,356 A | 8/1998 | Svancarek et al. | |
| 5,825,044 A | 10/1998 | Allen et al. | |
| 5,949,402 A * | 9/1999 | Garwin et al. | 345/156 |
| 5,994,710 A | 11/1999 | Knee et al. | |
| 6,040,950 A | 3/2000 | Broome | |
| 6,049,338 A | 4/2000 | Anderson et al. | |
| 6,057,540 A | 5/2000 | Gordon et al. | |

(Continued)

FOREIGN PATENT DOCUMENTS

EP 1081634 A2 3/2001

(Continued)

OTHER PUBLICATIONS

Bortz, J., Shatz, N., Pitou, D., "Optimal Design of a Nonimaging Projection Lens for Use With an LED Source and a Rectangular Target", Proceedings of SPIE, Vol. 4092, 2000.

(Continued)

*Primary Examiner*—Sandra O'Shea
*Assistant Examiner*—Jacob Y. Choi
(74) *Attorney, Agent, or Firm*—Fenwick & West LLP

(57) ABSTRACT

A system and method of manufacturing directed to an attachment system for use in an optical device. The attachment system mechanically couples a light source to an illumination lens using an attachment device. The attachment device can be an auto-centering device for reducing positional errors in a light beam emitted from the light source.

14 Claims, 6 Drawing Sheets

U.S. PATENT DOCUMENTS

| | | | |
|---|---|---|---|
| 6,084,574 A * | 7/2000 | Bidiville | 345/166 |
| 6,104,020 A | 8/2000 | Knee et al. | |
| 6,119,939 A * | 9/2000 | Schwartz et al. | 235/462.01 |
| 6,151,015 A | 11/2000 | Badyal et al. | |
| 6,175,357 B1 | 1/2001 | Gordon | |
| 6,188,057 B1 | 2/2001 | Misek | |
| 6,233,368 B1 | 5/2001 | Badyal et al. | |
| 6,281,882 B1 * | 8/2001 | Gordon et al. | 345/166 |
| 6,380,927 B1 | 4/2002 | Ostrum et al. | |
| 6,421,045 B1 * | 7/2002 | Venkat et al. | 345/167 |
| 6,462,330 B1 | 10/2002 | Venkat et al. | |
| 6,476,970 B1 | 11/2002 | Smith | |
| 6,501,460 B1 * | 12/2002 | Paik et al. | 345/163 |
| 6,531,692 B1 | 3/2003 | Adan et al. | |
| 6,657,184 B1 * | 12/2003 | Anderson et al. | 250/221 |

FOREIGN PATENT DOCUMENTS

| | | |
|---|---|---|
| EP | 1182606 A2 | 2/2002 |
| EP | 1283493 A2 | 2/2003 |
| WO | WO 99/39304 | 8/1999 |
| WO | WO 00/38103 | 6/2000 |
| WO | WO 00/57352 | 9/2000 |

OTHER PUBLICATIONS

*Mouse & Keyboard Products, IntelliMouse® Explorer*, [online], ©2004, [retrieved Oct. 22, 2004], 1 page, Retrieved from the Internet;<URL:http://www.microsoft.com/hardware/mouseandkeyboard/productdetai.

*Mouse & Keyboard Products, Trackball Optical*, [online], ©2004, [retrieved Oct. 22, 2004], 2 pages, Retrieved from the Internet;<URL;http://www.microsoft.com/hardware/mouseandkeyboard/productdetai.

*Mouse & Keyboard Products, Microsoft Optical Technology*, [online], ©2004, [retrieved Oct. 22, 2004], 2 pages, Retrieved from the Internet:<URL:http://www.microsoft.com/hardware/mouseandkeyboard/technologies.

* cited by examiner

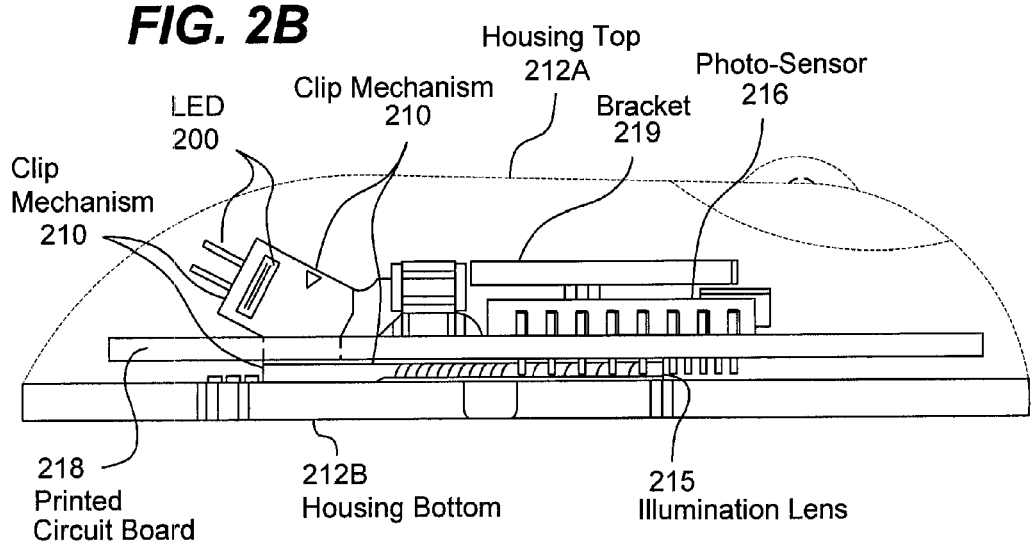
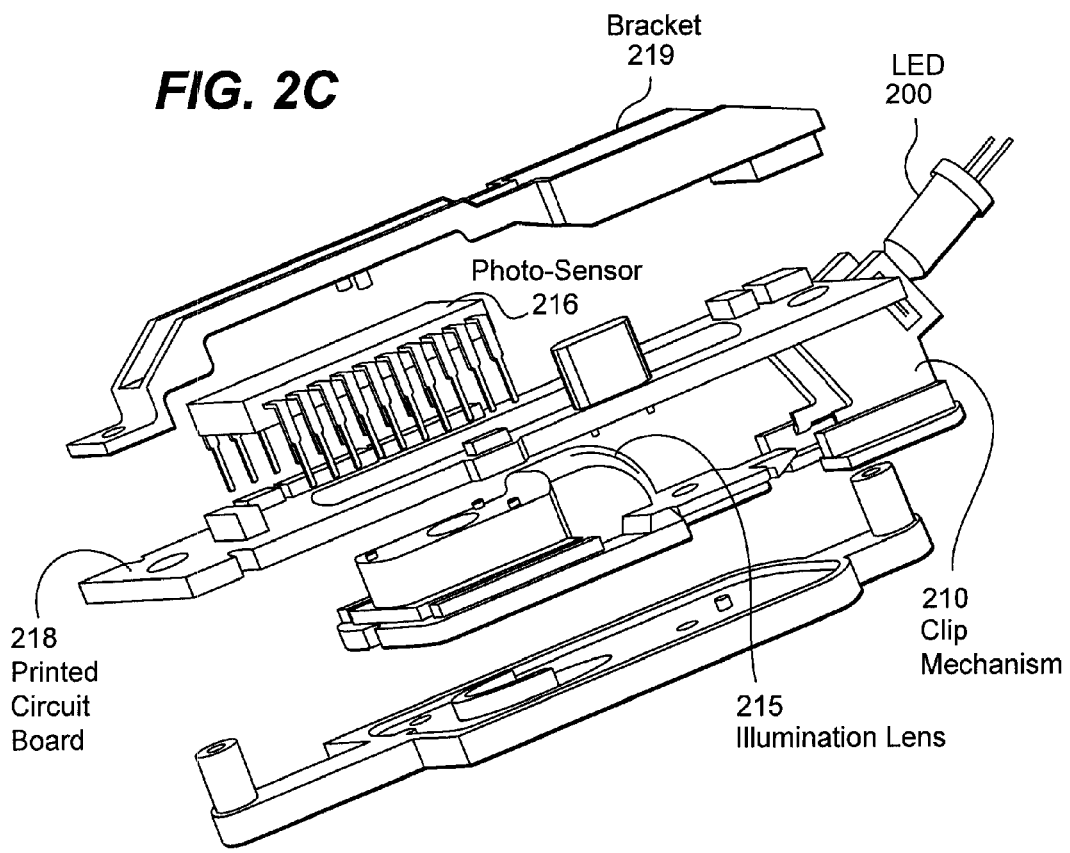

ISO

SIDE CUT

FRONT

ATTACHMENT SYSTEM FOR USE IN AN OPTICAL ILLUMINATION SYSTEM

RELATED APPLICATIONS

The present application relates to the subject matter of co-pending U.S. application Ser. No. 10/119,241, filed by Bidiville, et al. on Apr. 8, 2002.

BACKGROUND

A. Field of the Invention

The present invention relates generally to an attachment system for use with optical technology based displacement detection, and more particularly, to an attachment system for use with optical technology in an input device.

B. Description of the Related Art

Optical technology displacement detection is used in many contexts, including in optical input devices. There are many different types of input devices, including a mouse, a trackball, a joystick, and a digital pen. There are significant advantages to using optical input devices over mechanical and opto-mechanical input devices. For example, mechanical or opto-mechanical input devices have mechanical components that are more susceptible to breakdown, wear out, or clogging. Optical devices having only solid-state components are less susceptible to such breakdown, dirt, or wear out.

Optical input devices use a displacement of an image to detect movement of the input device relative to a surface, e.g., a table surface in the case of a mouse or a ball in the case of a trackball. Optical input devices use an illumination lens, an imaging lens, a sensor, and a light source to detect movement of the input device. Typically the light source is a light emitting diode (LED). The LED is usually attached with a conventional clip to a printed circuit board (PCB). The sensor is mounted on the PCB. The sensor is attached to the imaging lens. The conventional clip is not a precise clip. For example, if the PCB becomes warped or bent, the conventional clip will be holding the LED in place, but not in an optimum place. The LED package dimensions have large tolerances. These dimension errors also degrade the alignment of the LED.

Now referring to FIG. 1, there is shown an overview of a prior art attachment system. FIG. 1 shows an optical system 105, an optical illumination lens 115, a light source 100, a conventional clip 120, a PCB 125, and a sensor 130. The conventional clip 120 is attached to the PCB 125. The sensor 130 is mounted on the PCB 125. The sensor 130 is attached to the imaging lens.

A mechanical assembly for attaching the LED (the conventional clip) and its alignment with the illumination lens, imaging lens, and the sensor is critical to efficient performance of the optical device. The LED alignment has a direct impact on the surface illumination and therefore on image quality. Good surface illumination and good image quality is essential to an efficient optical system in an input device. A surface illumination has an illumination spot with a predetermined amount of energy, distributed as evenly as possible, and in alignment with the imaging lens. It also makes the device less sensitive to "difficult" surfaces. A "difficult" surface is one on which the optical device does not detect displacement very well, for example, a dark surface or a glossy surface. There are several reasons the alignment is not always good. One reason is the attachment system.

There are several main problems with conventional attachment systems. One problem with conventional systems is the illumination of the imaged area analyzed by the sensor. This problem results from the fact that the LED is not correctly and precisely positioned with respect to the illumination system. Thus, the illumination spot, the area actually lighted by the illumination system, is shifted relative to the imaged area. One solution conventional systems have employed to overcome this problem is to make the illumination spot much larger than the imaged area. However, this solution is inefficient because it wastes light, which translates to a waste of power.

Also, in conventional systems the LED is mounted on the PCB using a conventional clip. The PCB is coupled to the sensor, which is coupled to the illumination lens. The illumination lens is coupled to the imaging lens. Thus, the coupling between the LED and the illumination lens is dependent on the integrity of the conventional clip, the PCB, and the sensor. The conventional clip is a cylindrical tube, which holds the LED in place. However, due to large play required to accommodate the LED dimension errors, the LED can wiggle or wobble in the cylindrical tube causing positional errors in the light beam.

What is needed is an attachment system for use in an optical system that overcomes the above described problems and limitations of precise positioning of the light source relative to the illumination system.

SUMMARY OF THE INVENTION

The present invention provides an attachment system that aligns the LED and the illumination system. One feature of one embodiment of the present invention is an auto-centering attachment device. The attachment device mechanically couples the LED to the illumination lens in the optical system instead of the PCB. The attachment device reduces positional errors of the light beam in the system by directly coupling the LED to the illumination system. Thus, the positional errors are reduced because the position of the LED relative to the illumination lens is ensured by the attachment device of the present invention. The present invention does not rely solely on the integrity of the PCB, sensor, the conventional clip, or precise assembly.

The attachment device also maintains the LED in a desired position without allowing the LED to wiggle or wobble out of position. There are several embodiments of the attachment device, however, each of them have significant advantages over the conventional clip. The attachment device of the present invention controls the right/left position, the height position, and the azimuth (orientation) of the light beam emitted by the LED.

One embodiment of the attachment device of the present invention comprises a V-shaped attachment device. The LED is placed inside the "V" portion of the V-shaped device. In this embodiment, the right/left position of the light beam is controlled. However, the height position of the beam is not precisely controlled and an error in the LED diameter can cause a height error in the position of the light beam.

Another embodiment of the attachment device of the present invention comprises a gripper clip. A gripper clip is a hollow device with at least one gripper contact. A gripper contact is a tooth-like extension that provides a gripping contact for an element within the hollow device. In this embodiment of the present invention, the LED is placed within the hollow device. This embodiment also controls the right/left position of the light beam. However, the height position of the light beam is not precisely controlled.

Another embodiment of the attachment device of the present invention comprises a split tube. The split tube embodiment is a tubular device divided into a first portion and a second portion. In the first portion, the tube is cylindrical in shape, with an inner and an outer radius. In the second portion, the tube is split, an arc portion of the tube is removed at a predetermined arc section. In one embodiment, the tube is split once. In another embodiment, the tube is split more than once. In the present invention, the LED can be placed in the hollow center of the split tube. The split tube embodiment of the present invention controls the right/left position of a light beam and can control the height position of the light beam. The stiffness of both halves should be substantially equal so that the axis of the LED will be aligned with the axis of the tube.

The present invention can include at least one hook that hooks onto a shoulder portion of the LED such that the LED cannot be pulled out of the cylinder. Also, the LED can be electrically connected with a flexible wire to prevent additional errors caused by a force exerted by a rigid wire.

The combination of directly referencing the LED and the illumination lens and the attachment device of the present invention greatly reduces positional errors in the light beam.

As can be seen from the above description, the present invention may be applied to many different domains, and is not limited to any one application. Many techniques of the present invention may be applied to illumination in a number of optical detection systems.

BRIEF DESCRIPTION OF THE DRAWINGS

FIG. 2B illustrates of an internal structural configuration of a computer mouse in accordance with one embodiment of the present invention.

FIG. 2C is an exploded view of an internal structure configuration of a computer mouse in accordance with one embodiment of the present invention.

DETAILED DESCRIPTION OF THE INVENTION

The following description of the present invention is presented in the context of an attaching system for use in an optical illumination system for use in, for example, a computer input device. In some embodiments, the principles disclosed may be implemented for use in an optical mouse or an optical trackball. One skilled in the art will recognize that the present invention may be implemented in many other domains and environments, both within the context of optical illumination, and in other contexts. Different embodiments of the present invention are now described with reference to the figures where like reference numbers indicate identical or functionally similar elements. Also in the figures, the left most digit of each reference number typically corresponds to the figure in which the reference number is first used.

Figure 2A:
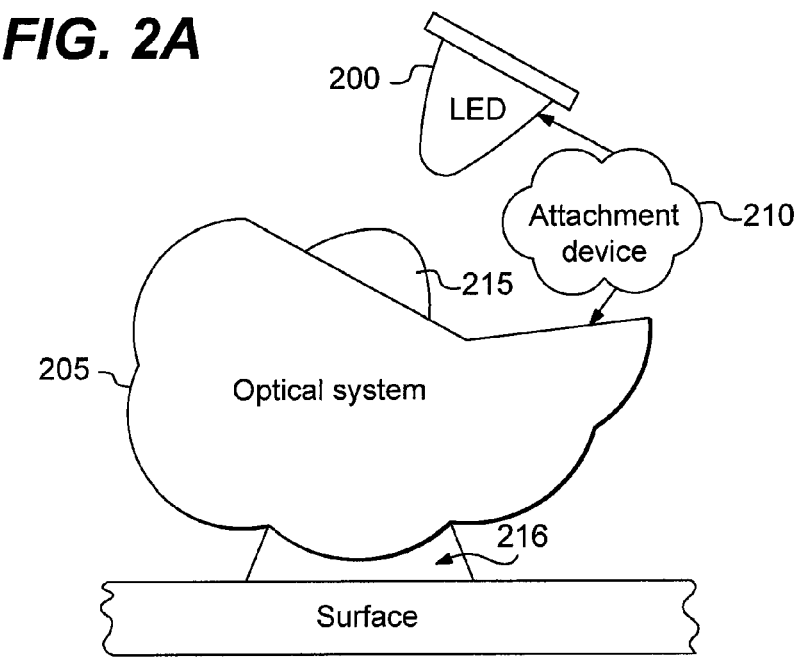
FIG. 2A is a block diagram illustrating an overview of an optical system of the present invention including the attachment system for mechanically coupling an LED to an illumination lens.

Now referring to FIG. 2A, there is shown an overview of an attachment system for use in an optical illumination system. FIG. 2A shows an optical system 205, an optical illumination lens 215, an attachment device 210, and a light source 200. In one embodiment, the light source 200 is a light emitting diode (LED) 200. Optical system 205 typically comprises a sensor and an imaging lens. Another optical component is the illumination lens 215. As described above, the alignment between the illumination lens 215 and light source 200 is important to the illumination of the imaged area. If the imaged area is not illuminated, the optical device may not operate efficiently, if at all.

FIGS. 2B and 2C illustrate an embodiment of the attachment device (clip mechanism) 210 as structured within an optical computer mouse in accordance with the present invention. FIG. 2B illustrates an internal structural configuration of a computer mouse in accordance with one embodiment of the present invention. The housing form factor of the mouse is illustrated with dashes in the figure. The computer mouse includes a housing 212, which includes a housing top 212a and a housing bottom 212b. Within the housing 212 is an assembly that includes the clip mechanism 210, the LED 200, and the illumination lens 215. Also shown is the photosensor 216, a printed circuit board 218, and a bracket 219. The clip mechanism is basically a unibody piece (see, e.g., FIG. 2C) that is positioned in the drawings so that a portion is above the printed circuit board 218 and a portion is below the printed circuit board 218. The bracket 219 is structured to help secure the photosensor 216 with the printed circuit board 218. The clip mechanism 210 and the illumination lens 215 are directly coupled together independent of the housing 212 or the printed circuit board 218.

FIG. 2C is an exploded view of an internal structure configuration of the computer mouse (within its housing 212) in accordance with one embodiment of the present invention. The exploded view illustrates the clip mechanism 210 to which the light source 200 and illumination lens 215 directly couple together. The direct coupling is independent of the printed circuit board 218 (as well as the housing 212) of the computer mouse. With the light source 200 and the illumination lens secured relative to each other, they are appropriately aligned with respect to each other and are no longer dependent on the other components that coupled together, e.g., the photosensor 216, the printed circuit board 218, the bracket 219, in order to be properly aligned.

The attachment device 210 of the present invention is an automatically centering device. It mechanically couples the light source 200 directly to the illumination lens 215. Thus, ensuring the mechanical alignment between the illumination lens 215 and the light source 200. When the illumination lens 215 and the light source 200 are aligned, the position errors of the light beam are greatly reduced. The alignment is no longer dependent on the PCB and sensor integrity. Additionally, an attachment device that more precisely aligns the LED can be used instead of using the conventional clip. The attachment device can be any clip, holder, fixture, support, or any other mechanical apparatus for mechanically coupling the LED 200 to the illumination lens 215. The attachment device can be made from injected plastic, for example, NYLON™, Acrylonitrate-Butadiene-Styrene (ABS), or PolyCarbonate (PC). In one embodiment, fiberglass fillers are used. The attachment device is described below in reference to FIGS. 3–6.

Figure 3A:
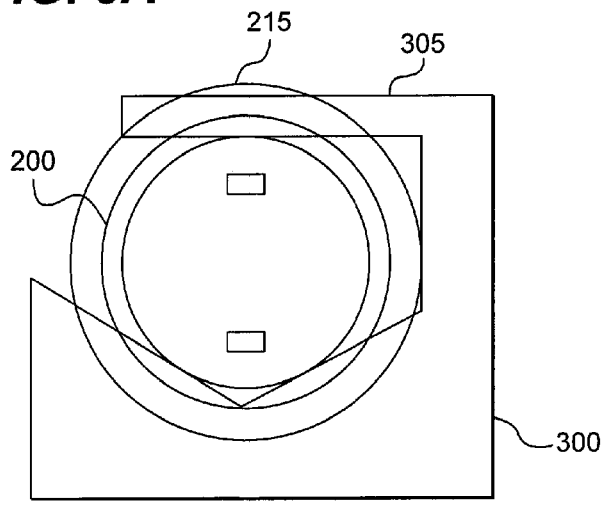
FIG. 3A is a front view of one embodiment of the present invention showing a V-shaped attachment device.
Figure 3B:
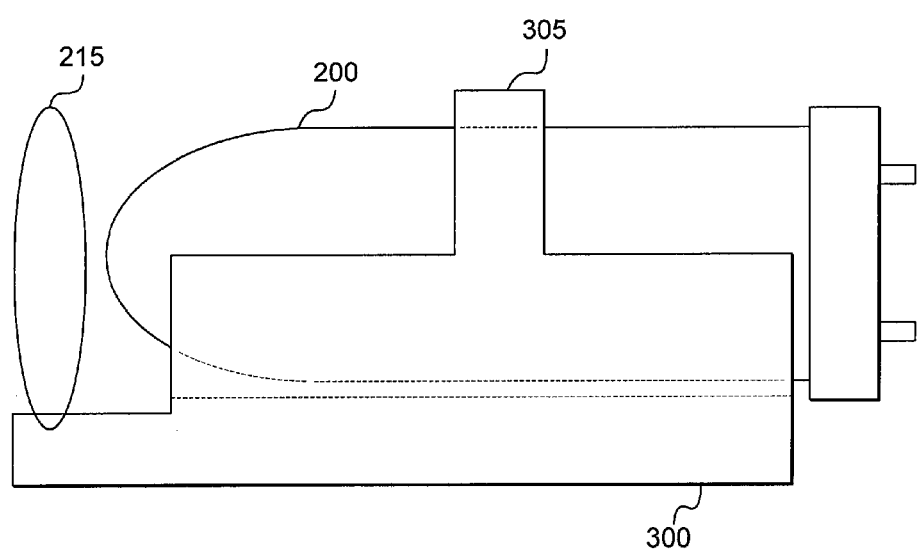
FIG. 3B is a side view of one embodiment of the present invention showing a V-shaped attachment device.
Figure 4C:
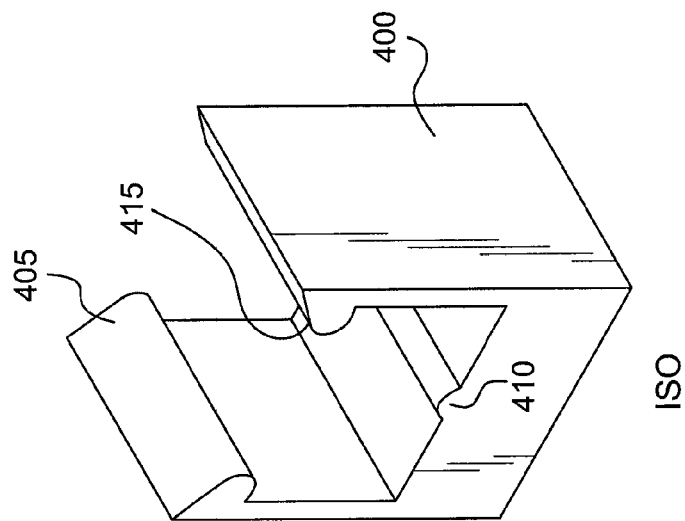
FIG. 4C is an isometric view of one embodiment of the present invention showing a gripper attachment device.
Figure 4B:
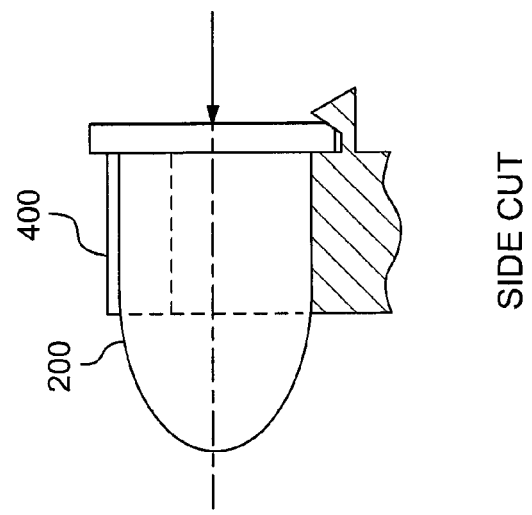
FIG. 4B is a side view of one embodiment of the present invention showing a gripper attachment device.
Figure 4A:
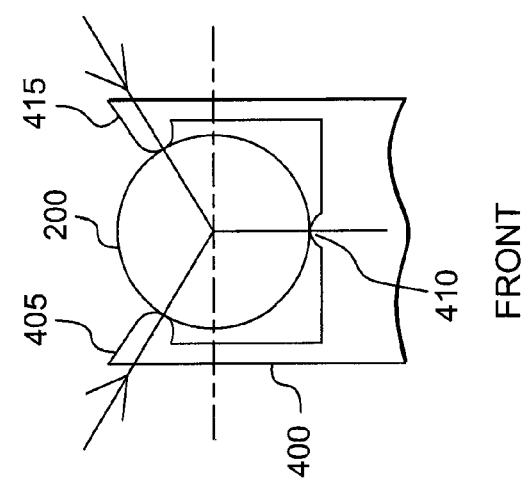
FIG. 4A is front view of one embodiment of the present invention showing a gripper attachment device.

Now referring to FIGS. 3A and 3B, there is shown a front view and a side view of one embodiment of the present invention attachment device. FIG. 3A shows a front view of one embodiment of the attachment device 300, LED 200, and forcing element 305. Forcing element 305 may be a flexible element of the plastic support, for example, a blade or a hook. In another embodiment, forcing element 305 may be a metallic retainer spring. FIG. 3B shows a side view of one embodiment of the attachment device 300, LED 200, and forcing element 305. In this embodiment the attachment device 300 is a V-shaped device as can be seen from the front view shown in FIG. 3A. The light source 200, or LED 200, rests inside the "V" shape. Thus, the LED 200 is held in place by the "V" shape. The LED 200 cannot move in the right/left direction because the "V" is adapted to the shape of the LED conically. Therefore, the beam of light emitted from the LED 200 is precisely in the optimum position in the right/left direction. However, clipping forcing element 305 indicates that the LED 200 may be free to move in the up/down, or height, direction as a result of diameter errors in the LED 200 itself. The forcing element 305 may be a flexible plastic blade used to accommodate the LED diameter variations.

FIG. 3B shows the placement of LED 200 in the attachment device 300. Again forcing element 305 provides the force required to achieve precision in the height position of the light beam. The forcing element 305 can be a flexible blade. The flexing of this blade is used to avoid the play resulting from LED diameter variations.

Figure 1:
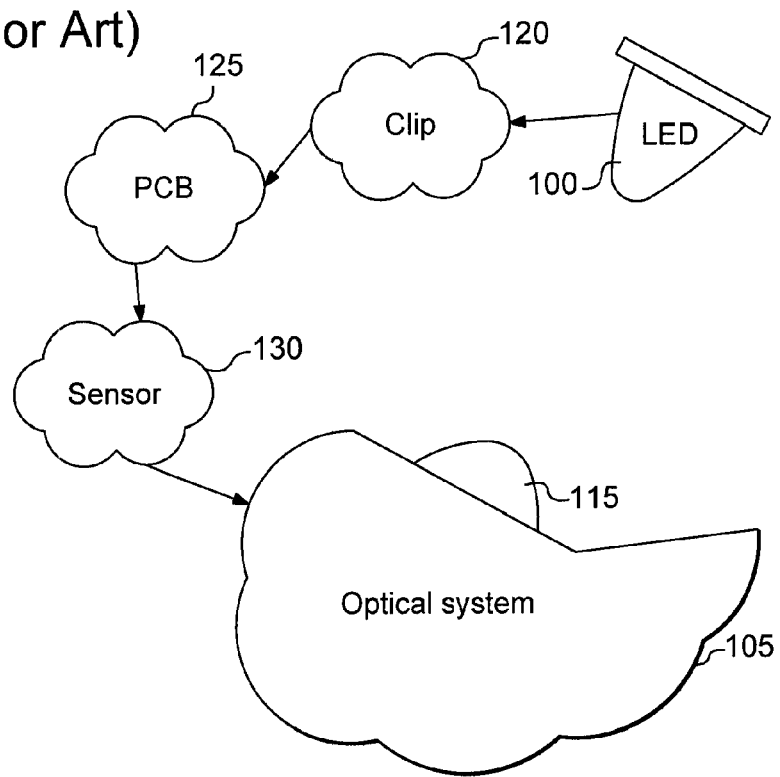
FIG. 1 is a block diagram illustrating an overview of a prior art optical system.

Now referring to FIG. 1, there is shown an overview of a prior art attachment system. FIG. 1 shows an optical system 105, an optical illumination lens 115, a light source 100, a conventional clip 120, a PCB 125, and a sensor 130. The conventional clip 120 is attached to the PCB 125. The sensor 130 is mounted on the PCB 125. The sensor 130 is attached to the imaging lens.

A mechanical assembly for attaching the LED (the conventional clip) and its alignment with the illumination lens, imaging lens, and the sensor is critical to efficient performance of the optical device. The LED alignment has a direct impact on the surface illumination and therefore on image quality. Good surface illumination and good image quality is essential to an efficient optical system in an input device. A surface illumination has an illumination spot with a predetermined amount of energy, distributed as evenly as possible, and in alignment with the imaging lens. It also makes the device less sensitive to "difficult" surfaces. A "difficult" surface is one on which the optical device does not detect displacement very well, for example, a dark surface or a glossy surface. There are several reasons the alignment is not always good. One reason is the attachment system.

There are several main problems with conventional attachment systems. One problem with conventional systems is the illumination of the imaged area analyzed by the sensor. This problem results from the fact that the LED is not correctly and precisely positioned with respect to the illumination system. Thus, the illumination spot, the area actually lighted by the illumination system, is shifted relative to the imaged area. One solution conventional systems have employed to overcome this problem is to make the illumination spot much larger than the imaged area. However, this solution is inefficient because it wastes light, which translates to a waste of power.

Figure 5A:
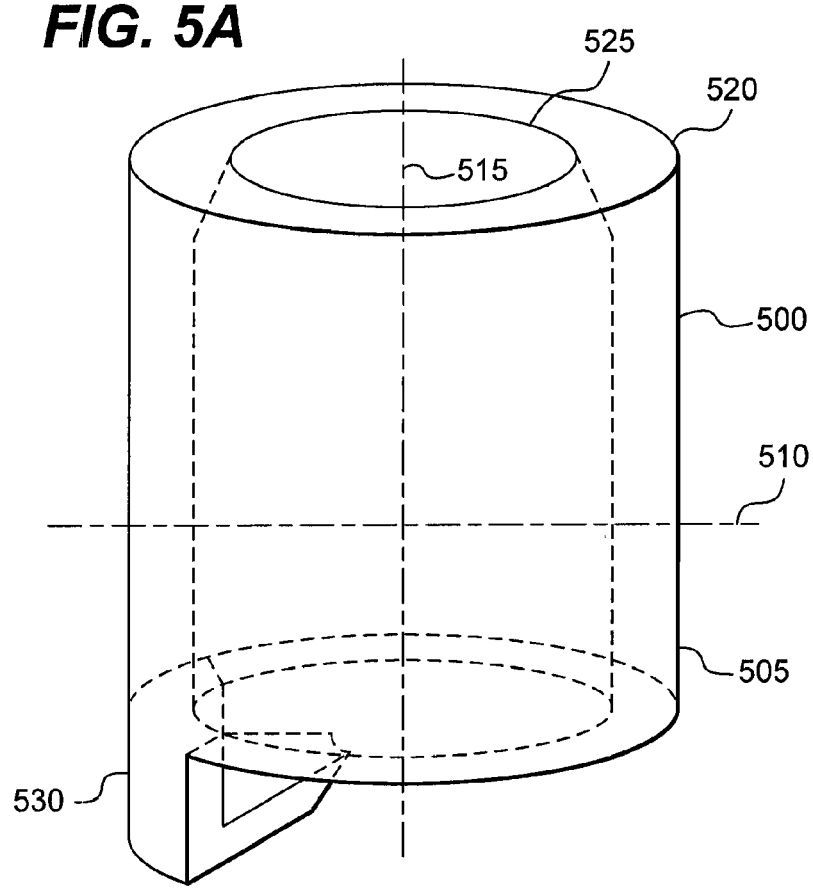
FIG. 5A is front view of one embodiment of the present invention showing a split tube attachment device.
Figure 5B:
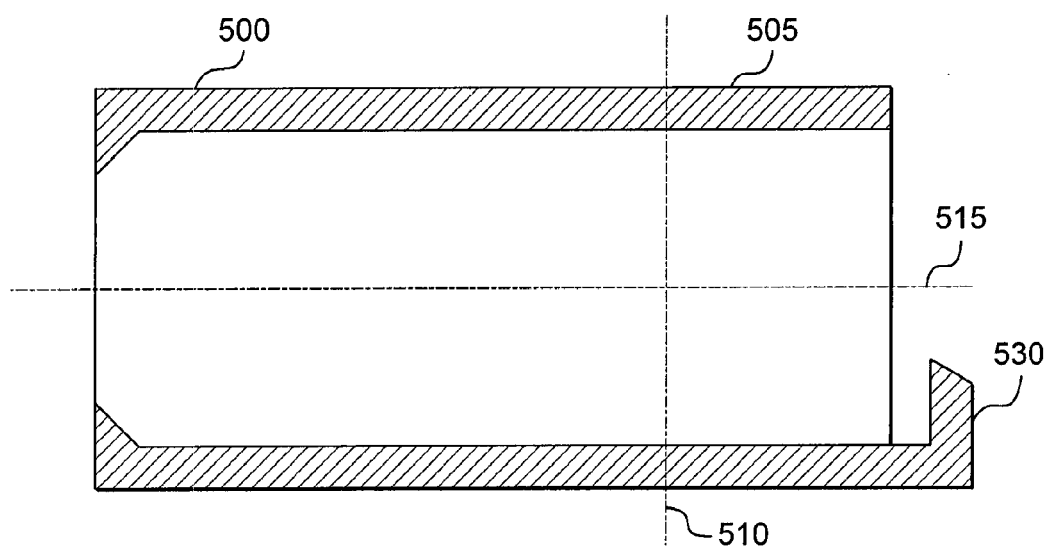
FIG. 5B is a side view of one embodiment of the present invention showing a split tube attachment device.

In this embodiment, the split tube is substantially cylindrical with the inner radius 525 and the outer radius 520. The first portion of the split tube 505 is conical in the shape and size of the LED it is holding as shown in FIG. 5B. The second portion of the split tube 500 is substantially cylindrical and in the size of the LED so that the LED can be placed inside the tube. The longitudinal axis 515 is an axis of the cylinder through a center of a circle formed by a vertical slice through the tube as shown in FIGS. 5A and 5B.

In any embodiment of the present invention, at least one hook 530 can be used that hooks onto a shoulder portion of the LED such that the LED cannot be pulled out of the cylinder. Also, the LED can be electrically connected with a flexible wire to prevent additional errors caused by a force exerted by a rigid wire.

Figure 6A:
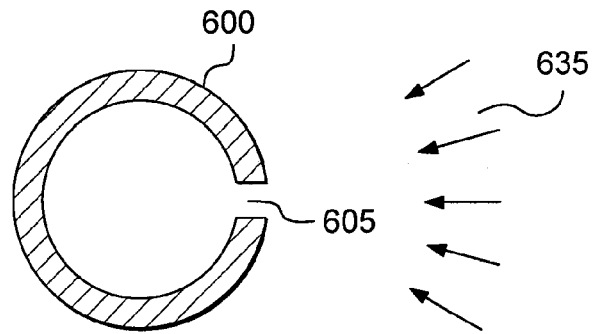
FIGS. 6A, 6B, and 6C are top views of three different embodiments of the present invention showing different embodiments of a split tube attachment device.
Figure 6B:
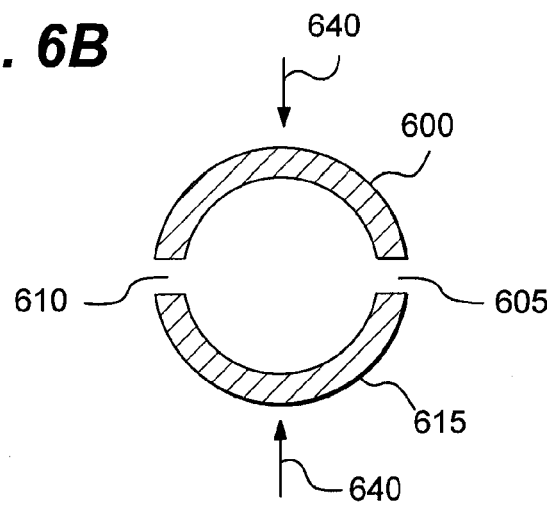
Figure 6C:
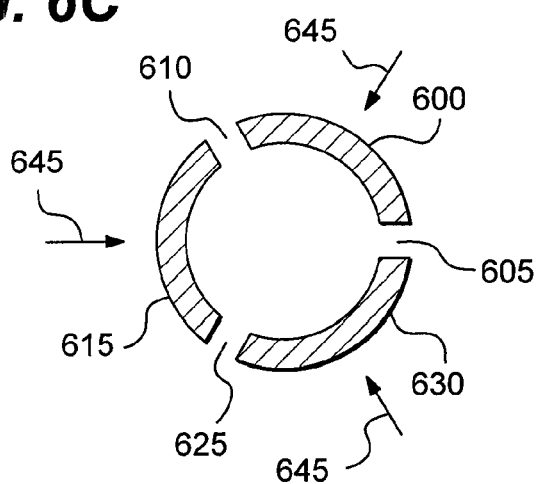

FIGS. 6A, 6B, and 6C show a top view of three different embodiments of a split tube attachment device. FIG. 6A shows the top view of the split tube with tube cross section 600, split 605, and force arrows 635. Split 605 is a cut in the second portion of the split tube 500. In other words, an arc of the tube is removed at a predetermined location in the tube. The split 600 is parallel to the longitudinal axis 515. The split 600 allows the tube to deform when the LED is inserted. Thus, the tube can deform to precisely fit the LED and prevent wobble from a system that does not exactly match the LED. Wobble can occur in other systems because the LED diameter tolerance is ±0.2 mm. Therefore, any rigid attachment device can have LED wobble due to diametrical errors in the LED.

The single split 605 shown in FIG. 6A allows the tube to deform eliminating play or wobble of the LED. However, the variation of deformation resulting from the variations in the LED diameter result in LED axis variations.

FIG. 6B shows a top view of another embodiment of the attachment device of the present invention. FIG. 6B shows tube sections 600 and 615, splits 605 and 610, and force arrows 640. In this embodiment, there are two splits in the tube 605 and 610. The two splits 605 and 610 can be approximately equally spaced. Thus, allowing the tube to deform to fit the LED. Having two splits 605 and 610 causes the force on the tube to be symmetrical, as shown by force arrows 640. Thus, the position of the light beam axis can be precisely controlled.

FIG. 6C shows a top view of another embodiment of the attachment device of the present invention. FIG. 6B shows tube sections 600, 615, and 630, splits 605, 610, and 625, and force arrows 645. The three splits 605, 610, 625 can be approximately equally spaced. Having three splits 605, 610, and 625 allows the tube to deform to exactly fit the LED. In one embodiment, the three sections have substantially the same strength so that they deform equally to fit the LED. The LED receptacle can be attached to the rest of the clip through the end that is not split to insure the three sections deform equally. Consequently, the LED axis is aligned with the axis of the clip hole, unaffected by LED diameter variations. Also, the forces are spread out as shown by force arrows 645 such that the LED is precisely held in place in the right/left, height, and azimuth.

Thus, with the attachment device shown in FIGS. 3–6 using the attachment system shown in FIG. 2 the LED 200 can be precisely held in place and auto-centered and directly coupled to the illumination lens. Therefore, position errors of the light beam are greatly reduced From the above description, it will be apparent that the invention disclosed herein provides a novel and advantageous system for attaching the LED in an optical device. The foregoing discussion discloses and describes merely exemplary embodiments of the present invention. As will be understood by those familiar with the art, the invention may be embodied in other specific forms without departing from the spirit or essential characteristics thereof. For example, the invention may be applied to other domains and environments, and may be employed in connection with additional applications where an attachment system is desirable.

Accordingly, the following description, while intended to be illustrative of a particular implementation, is not intended to limit the scope of the present invention or its applicability to other domains and environments. Rather, the scope of the present invention is limited and defined solely by the claims

We claim:

1. In a computer mouse, the computer mouse including a housing and providing displacement information to a computing system, the computer mouse comprising:
   a light source for generating a light beam to illuminate an image area;
   an illumination lens for directing the light beam from the light source to the imaged area on a surface, the imaged area of the surface reflecting light;
   a printed circuit board having a photosensor receiving the reflected light, the received reflected light for use in providing the displacement information from the imaged area: and
   a clip mechanism structured to couple the light source and the illumination lens directly together and structured to fixedly align the light source with the illumination lens independent of the printed circuit board and the housing, the clip mechanism and the printed circuit board structured within the housing of the computer mouse.

2. The assembly of claim 1, wherein the clip is a V-shaped structure.

3. The assembly of claim 1, wherein the light source is secured in a cavity formed by the V-shaped structure.

4. The assembly of claim 1, wherein the light source comprises a light emitting diode.

5. The assembly of claim 1, wherein the illumination lens is structured in a conical shape.

6. The assembly of claim 1, wherein the clip mechanism comprises a gripper contact configuration.

7. The assembly of claim 1, wherein the clip mechanism comprises a split tube configuration.

8. A computer mouse having a housing and providing displacement information to a computing system, the computer mouse comprising:
   a housing;
   a means for generating a light beam to illuminate an image area;
   an means for directing the light beam from the light source to the imaged area on a surface, the imaged area of the surface reflecting light;
   a printed circuit board having a photosensor receiving the reflected light, the received reflected light for use in providing the displacement information from the imaged area; and
   a means for attaching the light source and the illumination lens and structured to fixedly align the light source with the illumination lens directly together independent of the printed circuit board and the housing, the clip mechanism further structured to couple the printed circuit board, the printed circuit board and the means for attaching structured within the housing of the computer mouse.

9. The optical pointing device of claim 8, wherein the means for attaching is a V-shaped structure.

10. The optical pointing device of claim 9, wherein the means for generating light is secured in a cavity formed by the V-shaped structure.

11. The optical pointing device of claim 8, wherein the means for generating light comprises a light emitting diode.

12. The optical pointing device of claim 8, wherein the means for directing the light beam is structured in a conical shape.

13. The optical pointing device of claim 8, wherein the means for attaching comprises a gripper contact configuration.

14. The optical pointing device of claim 8, wherein the means for attaching comprises a split tube configuration.

* * * * *